United States Patent [19]

Raterman et al.

[11] Patent Number: 5,538,696
[45] Date of Patent: Jul. 23, 1996

[54] FCC PROCESS AND APPARATUS WITH CONTAINED VORTEX THIRD STAGE SEPARATOR

[75] Inventors: Michael F. Raterman, Doylestown, Pa.; Christopher G. Smalley, Hamilton, N.J.

[73] Assignee: Mobil Oil Corporation, Fairfax, Va.

[21] Appl. No.: 236,975

[22] Filed: May 2, 1994

[51] Int. Cl.⁶ .................................................. F27B 15/12
[52] U.S. Cl. .............................. 422/147; 55/345; 55/347; 55/459.1
[58] Field of Search ........................ 422/147; 55/343, 55/345–349, 459.1

[56] References Cited

U.S. PATENT DOCUMENTS

| | | | |
|---|---|---|---|
| 3,259,246 | 7/1966 | Stavenger | 55/459.1 X |
| 3,261,467 | 7/1966 | Wikdahl | 55/459.1 X |
| 4,285,706 | 8/1991 | Dehne | 55/343 |
| 5,178,648 | 1/1993 | Kalen et al. | 55/459.1 X |
| 5,221,301 | 6/1993 | Giuricich | 55/459.1 X |

Primary Examiner—Timothy M. McMahon
Attorney, Agent, or Firm—Alexander J. McKillop; Malcolm D. Keen; Richard D. Stone

[57] ABSTRACT

Horizontal, small diameter cyclones are disclosed. Gas and fines are added tangentially around a clean vapor outlet tube in a cylindrical cyclone. A vortex of solids and some gas passes into a contiguous and axially aligned cylindrical vortex containment means from which solids are withdrawn via a horizontal slot. 0–5 micron particle removal is enhanced. An FCC process uses the cyclones as a third stage separator. An alternative design uses a half pipe extension on the solids outlet to confine the vortex of solids and gas.

11 Claims, 6 Drawing Sheets

FCC PROCESS AND APPARATUS WITH CONTAINED VORTEX THIRD STAGE SEPARATOR

BACKGROUND OF THE INVENTION

1. Field of the Invention

The field of the invention is fluidized catalytic cracking of heavy hydrocarbon feeds and cyclones for separating fine solids from vapor streams.

2. Description of Related Art

Catalytic cracking is the backbone of many refineries. It converts heavy feeds into lighter products by catalytically cracking large molecules into smaller molecules. Catalytic cracking operates at low pressures, without hydrogen addition, in contrast to hydrocracking, which operates at high hydrogen partial pressures. Catalytic cracking is inherently safe as it operates with very little oil actually in inventory during the cracking process.

There are two main variants of the catalytic cracking process: moving bed and the far more popular and efficient fluidized bed process.

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425° C.–600° C., usually 460° C.–560° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500° C.–900° C., usually 600° C.–750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking is endothermic, it consumes heat. The heat for cracking is supplied at first by the hot regenerated catalyst from the regenerator. Ultimately, it is the feed which supplies the heat needed to crack the feed. Some of the feed deposits as coke on the catalyst, and the burning of this coke generates heat in the regenerator, which is recycled to the reactor in the form of hot catalyst.

Catalytic cracking has undergone progressive development since the 40s. Modern fluid catalytic cracking (FCC) units use zeolite catalysts. Zeolite-containing catalysts work best when coke on the catalyst after regeneration is less than 0.1 wt %, and preferably less than 0.05 wt %.

To regenerate FCC catalyst to this low residual carbon level and to burn CO completely to CO2 within the regenerator (to conserve heat and reduce air pollution) many FCC operators add a CO combustion promoter. U.S. Pat. Nos. 4,072,600 and 4,093,535, incorporated by reference, teach use of combustion-promoting metals such as Pt, Pd, Ir, Rh, Os, Ru and Re in cracking catalysts in concentrations of 0.01 to 50 ppm, based on total catalyst inventory.

Most FCC's units are all riser cracking units. This is more selective than dense bed cracking. Refiners maximize riser cracking benefits by going to shorter residence times, and higher temperatures. The higher temperatures cause some thermal cracking, which if allowed to continue would eventually convert all the feed to coke and dry gas. Shorter reactor residence times in theory would reduce thermal cracking, but the higher temperatures associated with modern units created the conditions needed to crack thermally the feed. We believed that refiners, in maximizing catalytic conversion of feed and minimizing thermal cracking of feed, resorted to conditions which achieved the desired results in the reactor, but caused other problems which could lead to unplanned shutdowns.

Emergency shutdowns are much like wheels up landings of airplanes, there is no loss of life but the economic losses are substantial. Modern FCC units must run at high throughput, and run for years between shutdowns, to be profitable. Much of the output of the FCC is needed in downstream processing units, and most of a refiners gasoline pool is usually derived directly from the FCC unit. It is important that the unit operate reliably for years, and be able to accommodate a variety of feeds, including very heavy feeds. The unit must operate without exceeding local limits on pollutants or particulates. The catalyst is somewhat expensive, and most units have several hundred tons of catalyst in inventory. Most FCC units circulate tons of catalyst per minute, the large circulation being necessary because the feed rates are large and for every ton of oil cracked roughly 5–7 tons of catalyst are needed.

Catalyst must be removed from cracked products lest the heavy hydrocarbon products be contaminated with catalyst and fines. Catalyst and fines must also be removed from flue gas discharged from the regenerator. Any catalyst not recovered by the regenerator cyclones stays with the flue gas, unless an electrostatic precipitator, bag house, or some sort of removal stage is added at considerable cost. The amount of fines in most FCC flue gas streams exiting the regenerator is enough to cause severe erosion of turbine blades if a power recovery system is installed to try to recover some of the energy in the regenerator flue gas stream.

The solids remaining at this point are exceedingly difficult to recover, having successfully avoided capture despite passing through several stages of highly efficient cyclones. The solids are very small, essentially all of the solids are below 20 microns, and including significant amounts of submicron to under 5 micron sized material.

Collection of such solids has been a challenge for almost a century. A survey of the state of the art is described in Perry's Chemical Engineering Handbook, in DUST-COLLECTION EQUIPMENT, abstracted hereafter. A gravity settling chamber could be used, but generally only works for particles larger than about 40 microns in diameter. Small particles have a long settling time and are swept out before they settle, unless the device has a large cross-sectional area. The Howard dust chamber improved things a bit by providing multiple horizontal plates in the chamber, so that the dust did not have so far to fall. This device is discussed in Perry's Chemical Engineer's Handbook, Sixth Edition, page 20–82, which reports that the Howard device was the subject of a 1908 patent entitled "Fume Arrester". For an FCC regenerator, with large volumes of regenerator air, and large amounts of fines and dust, a settling chamber with a larger footprint than the entire FCC unit including main fractionator would be required.

Impingement separators improved things a bit, by using inertial forces to drive particles to impinge on collecting bodies in the gas stream. These work well for particles above 20 microns, and have little effect on the dust in FCC regenerator flue gas.

Cyclone separators are settling chambers in which gravitational acceleration is replaced by centrifugal acceleration. FCC regenerators use large cyclone separators, and are able to efficiently recover essentially particles larger than about 15 microns. Collection efficiency is poor for smaller than 15 micron sized particles, and becomes very poor for anything smaller than 5 or 10 microns. To increase collection efficiency in FCC regenerator cyclones, refiners have accepted higher pressure drop by increasing the velocity of incoming gas to the cyclone.

Refiners typically use 2 to 8 primary and 2 to 8 secondary cyclones in their FCC regenerators, because of mechanical constraints and pressure drop concerns. These cyclones have a fairly large diameter, which restricts the amount of centrifugal acceleration which can be achieved.

Thus FCC regenerators inherently let a large amount of fines and dust, in the below 15 micron range, pass out with the flue gas. This material must be removed from the flue gas prior to discharge to the atmosphere, or passage through a power recovery turbine.

Generally a third stage separator is installed upstream of the turbine to reduce the catalyst loading and protect the turbine blades, or permit discharge of flue gas to the air. These can be 20, 50, 100 or even more small diameter cyclones. The third stage separator can use large numbers of small cyclones because it is not in or a part of the FCC regenerator. Small diameter cyclones are used because these give much better fines collection than larger cyclones, for the same gas velocity and pressure drop. Perry's Chemical Engineer's Handbook, Sixth Edition, in Table 20–33 reports that for a 5–20 micron dust mixture, dust collection improves significantly as cyclone diameter decreased, with collection efficiencies for 6, 9 and 24 inch cyclones being 90%, 83% and 70% respectively.

Several vendors (Polutrol and Emtrol) supply systems with many small diameter, horizontally mounted, closely connected and radially distributed cyclones about a central gas outlet. The use of multiple, small, horizontally mounted cyclones is also known for general dust removal, see e.g., the Dustex miniature collector assemble shown in FIG. 20-108 of Perry's Chemical Engineering Handbook, Sixth Edition. Gas is tangentially added to a great number of generally horizontally mounted cyclones. Purified gas is withdrawn via a central gas outlet near the tangential inlet, while dust is removed from the opposite end of the cyclone, which may be of reduced diameter but is unsealed.

Although such third stage separators help a lot, they have never been as efficient as desired, and some refiners have had to install electrostatic precipitators or a baghouse downstream of the third stage separator to reduce fines emissions.

We wanted to improve the operation of third stage cyclones. Based on observations and testing of a small diameter, horizontally mounted cyclone, we realized the way to improve the performance of these cyclones was not to use more or them, or smaller diameter units, but rather to contain some of the problems inherent in the use of such devices.

We observed that the same high velocities, and high centrifugal forces which imparted sufficient inertial force to remove micron and submicron particles also induced turbulence which re-entrained separated particles in the collection chamber. We wanted to retain the virtues of these devices, the high centrifugal forces which could displace submicron particles from a flowing gas stream. To improve the device, we needed to maintain the high energy vortex set up in the collection chamber to induce inertial separation, but prevent this high energy stream from inducing re-entrainment.

We discovered that the operation of small diameter, horizontally mounted cyclones could be improved by providing in the collection chamber of the device a means to permit the high energy vortex extend past the solids outlet. Preferably, a slotted solids outlet is provided which is parallel to the vortex formed in the horizontal cyclone. In this way, we contain the vortex, and protect collected solids from the vortex, thus reducing re-entrainment of collected particles.

BRIEF SUMMARY OF THE INVENTION

The present invention provides a horizontal cyclone separator comprising a primary cylindrical cyclone body having a diameter and a cylindrical axis disposed horizontally or within 30° of horizontal, said primary cyclone body having: an open end portion having a tangential vapor inlet for a vapor stream and entrained solids for formation of a vortex of vapor and entrained solids; a cylindrical vapor outlet tube in said open end portion having an inlet extending into said primary cylindrical cyclone body and a vapor outlet tube cylindrical axis aligned with said cylindrical axis of said primary cylindrical cyclone body; a vortex outlet at an opposite end of said primary cylinder for vapor and entrained solids, said vortex outlet comprising a circular opening having a center in axial alignment with said vapor outlet tube, and wherein said vortex outlet has a diameter no greater than the diameter of said primary cylindrical cyclone body; a vortex containment cylindrical body having cylindrical sidewalls, a length and a diameter smaller than the diameter of said primary cyclone body at the tangential inlet, said vortex cylinder having a cylindrical axis axially aligned with said primary cyclone body and comprising: an open end connective with said vortex outlet of said primary cyclone body for admission of a vortex of gas and entrained solids; a sealed end portion located at an opposing end of said cylindrical body from said open end; and a solids and gas outlet slot in said sidewalls of said vortex cylinder, said slot is in a lower portion of said vortex cylinder, is parallel to the axis of said vortex cylinder, and has a length at least 50% of the length of said vortex cylinder.

In another embodiment, the present invention provides a fluidized catalytic cracking process wherein a heavy feed is catalytically cracked by contact with a regenerated cracking catalyst in a cracking reactor to produce lighter products and spent catalyst, and wherein spent catalyst is regenerated in a catalyst regeneration means containing primary and secondary separators for recovery of catalyst and fines from flue gas to produce a flue gas stream containing entrained catalyst fines, and a third stage separator is used to remove at least a portion of the catalyst fines from the flue gas, said third stage separator comprising at least 50 horizontal cyclones comprising a primary cylindrical cyclone body having a diameter and a cylindrical axis disposed horizontally or within 30° of horizontal, said primary cyclone body having an open end portion having a tangential vapor inlet for a vapor stream and entrained solids for formation of a vortex of vapor and entrained solids; a cylindrical vapor outlet tube in said open end portion having an inlet extending into said primary cylindrical cyclone body and a vapor outlet tube cylindrical axis aligned with said cylindrical axis of said primary cylindrical cyclone body a vortex outlet at an opposite end of said primary cylinder for vapor and entrained solids, said vortex outlet comprising a circular opening having a center in axial alignment with said vapor outlet tube, and wherein said vortex outlet has a diameter no greater than the diameter of said primary cylindrical cyclone body; a vortex containment cylindrical body having cylindrical sidewalls, a length and a diameter smaller than the diameter of said primary cyclone body at the tangential inlet, said vortex cylinder having a cylindrical axis axially aligned with said primary cyclone body and comprising an open end connective with said vortex outlet of said primary cyclone body for admission of a vortex of gas and entrained solids a sealed end portion at an opposing end of said cylindrical body from said open end; and a solids and gas outlet slot in said sidewalls of said vortex cylinder, said slot is in a lower portion of said vortex cylinder, is parallel to the axis of said vortex cylinder, and has a length at least 50% of the length of said vortex cylinder.

In another embodiment, the present invention provides a horizontal cyclone separator comprising a primary cylindrical cyclone body having a diameter and a cylindrical axis disposed horizontally or within 30° of horizontal, said primary cyclone body having an open end portion having a tangential vapor inlet for a vapor stream and entrained solids for formation of a vortex of vapor and entrained solids; a cylindrical vapor outlet tube in said open end portion having an inlet extending into said primary cylindrical cyclone body and a vapor outlet tube cylindrical axis aligned with said cylindrical axis of said primary cylindrical cyclone body; a vortex outlet at an opposite end of said primary cylinder for vapor and entrained solids, said vortex outlet comprising a circular opening having a center in axial alignment with said vapor outlet tube, and wherein said vortex outlet has a diameter no greater than the diameter of said primary cylindrical cyclone body; a halfpipe extension, fluidly connected with said vortex outlet comprising the upper one half of the surface of a right cylinder having a radius, an altitude and a cylindrical axis, and wherein said radius of said extension is less than a radius of said primary cyclone body; said altitude of said extension is equal to or greater than said inlet of said vapor outlet tube extending into said cyclone body; and said cylindrical axis of said extension is axially aligned with said vapor outlet tube.

Other preferred embodiments relate to preferred shapes and sizes, such as use of perfectly horizontal cyclones, use of an outlet tube with a diameter of 65 to 90 mm and a length inside said cyclone body of 125 to 150 mm, and a halfpipe extension of a 500 mm length of 8" schedule 40 pipe cut or split in half.

DETAILED DESCRIPTION

Figure 1:
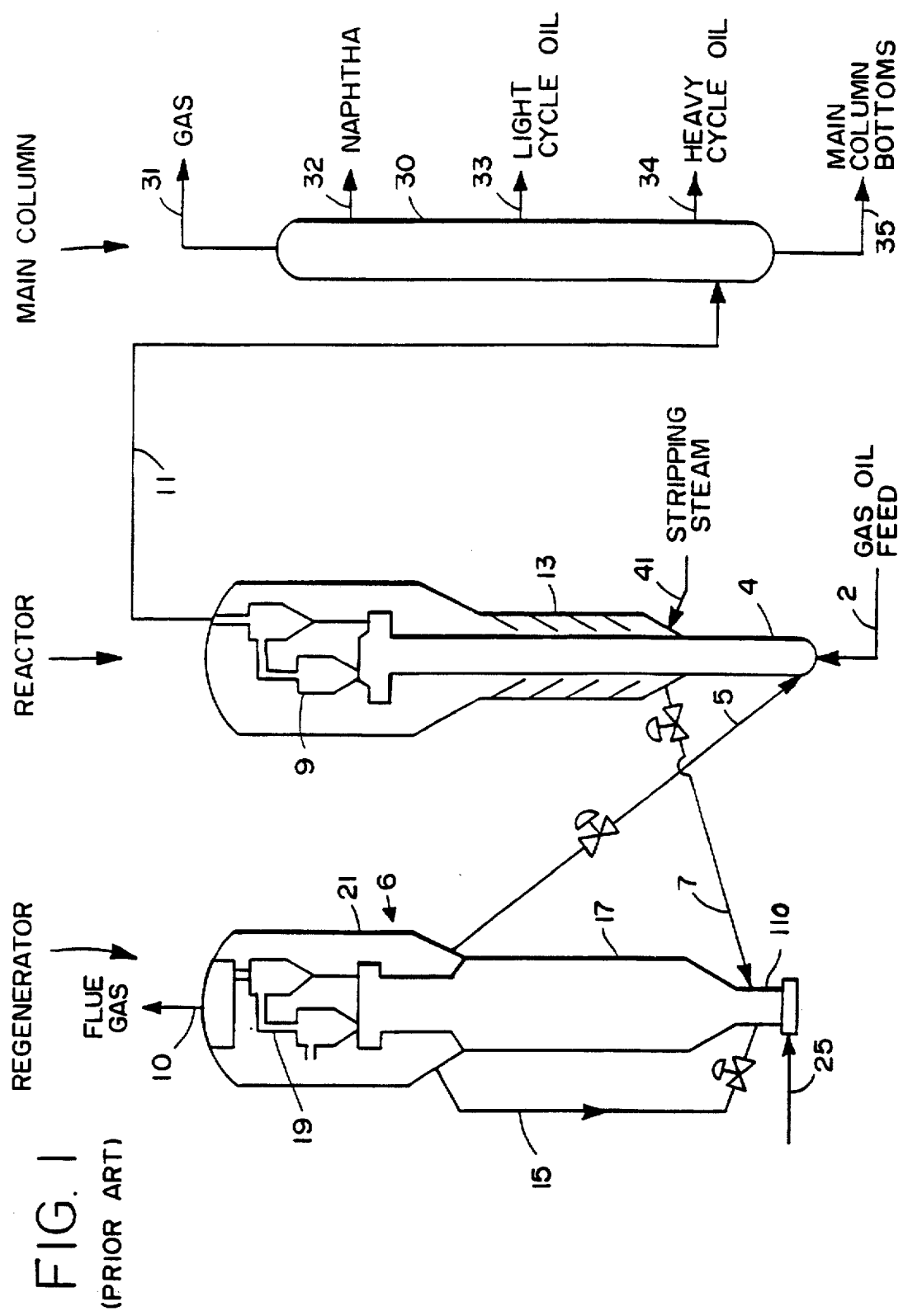
FIG. 1 (prior art) is a simplified schematic view of an FCC unit of the prior art.

The present invention can be better understood by reviewing it in conjunction with a conventional riser cracking FCC unit. FIG. 1 illustrates a fluid catalytic cracking system of the prior art, and is similar to the Kellogg Ultra Orthoflow converter Model F shown as FIG. 17 of Fluid Catalytic Cracking Report, in the Jan. 8, 1990 edition of *Oil & Gas Journal*. There are myriad other FCC units which can benefit from the process of the present invention, but the process of the present invention works very well with this type of FCC unit.

A heavy feed such as a gas oil, vacuum gas oil is added to riser reactor 6 via feed injection nozzles 2. The cracking reaction is almost completed in the riser reactor, which takes a 90° turn at the top of the reactor at elbow 10. Spent catalyst and cracked products discharged from the riser reactor pass through riser cyclones 12 which efficiently separate most of the spent catalyst from cracked product. Cracked product is discharged into disengager 14 and eventually is removed via upper cyclones 16 and conduit 18 to the fractionator.

Spent catalyst is discharged down from a dipleg of riser cyclones 12 into catalyst stripper 8 where one, or preferably 2 or more, stages of steam stripping occur, with stripping steam admitted by means 19 and 21. The stripped hydrocarbons, and stripping steam, pass into disengager 14 and are removed with cracked products after passage through upper cyclones 16.

Stripped catalyst is discharged down via spent catalyst standpipe 26 into catalyst regenerator 24. The flow of catalyst is controlled with spent catalyst plug valve 36.

Catalyst is regenerated in regenerator 24 by contact with air, added via air lines and an air grid distributor not shown. A catalyst cooler 28 is provided so heat may be removed from the regenerator if desired. Regenerated catalyst is withdrawn from the regenerator via regenerated catalyst plug valve assembly 30 and discharged via lateral 32 into the base of the riser reactor 6 to contact and crack fresh feed injected via injectors 2 as previously discussed. Flue gas, and some entrained catalyst, is discharged into a dilute phase region in the upper portion of regenerator 24. Entrained catalyst is separated from flue gas in multiple stages of cyclones 4 and discharged via outlets 38 into plenum 20 for discharge to the flue gas line via line 22.

This regenerator is ideal for the practice of the present invention. The bubbling dense bed in such a regenerator exhibits excellent horizontal mixing, and the heat exchanger 28 allows full CO burn operation even with heavy feeds.

FIG. 1 does not show a third stage separator. Line 22 in most refineries would go to some type of third stage separator (not shown), usually one involving 50 or 100 (or more) small diameter horizontal cyclones. Purified flue gas would then pass through an optional power recovery turbine (not shown) then go to a stack for discharge to the atmosphere, via some flue gas clean up devices, such as an SOx scrubber, or electrostatic precipitator.

Figure 2:
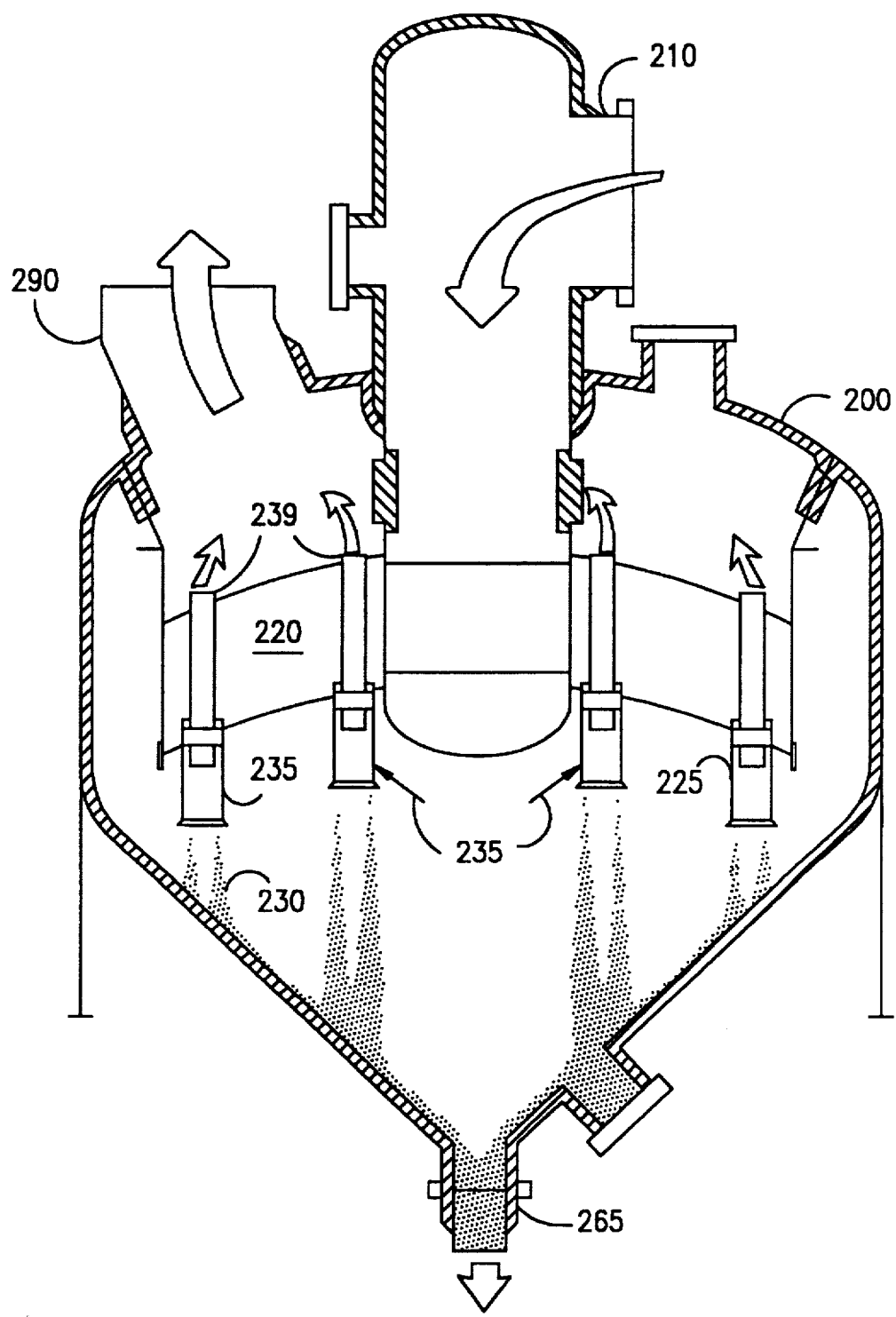
FIG. 2 (prior art) is a simplified schematic view of a third stage separator of the prior art.

FIG. 2 (Prior Art) is similar to FIG. 1 of Improved hot-gas expanders for cat cracker flue gas, Hydrocarbon Processing, March 1976, p. 141. This article is incorporated by reference.

Third stage separator 200 receives a fines containing FCC flue gas via inlet 210. Gas is distributed via plenum 220 to the inlets of a plurality of small diameter ceramic tubes 235 containing swirl vanes not shown. Fines collect on the walls of tubes 235 and are discharged from the base of the tubes as an annular stream of solids 230. A clean gas stream is withdrawn via outlet tubes 239 to be removed from the vessel via outlet 290. Solids are removed via solids outlet 265.

Figure 3:
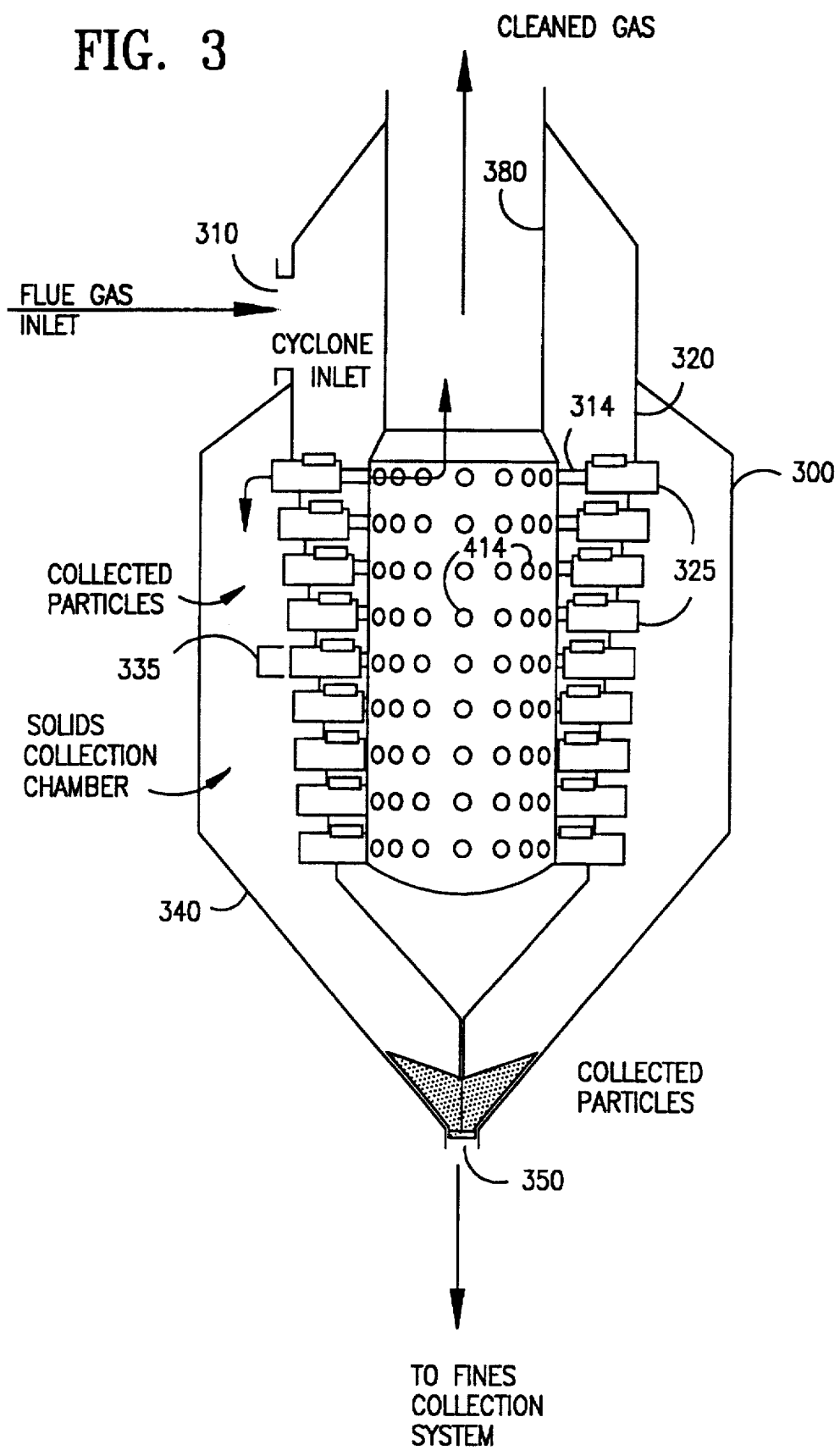
FIG. 3 (Invention) is a sectional view of a third stage separator with one cyclone having the outlet modification of the invention.

FIG. 3 (invention) shows a schematic view of a third stage separator. The solid lines show a prior art design, while the dashed lines show where a scroll outlet of the invention would be added. Although only a single scroll outlet is shown, and places for over 100 cyclones are shown, in practice each cyclone would have a scroll outlet.

A mixture of flue gas and entrained fines enters the inlet 310 of third stage separator 300. The mixture flows through a plenum defined by walls 320 to tangentially enter a plurality of horizontal cyclones 325. A scroll outlet stage 335 is shown added to one cyclone, to illustrate how the modified solids and underflow outlet of the invention might be incorporated into existing third stage separators. Solids discharged from the cyclones pass down through conical collector 340 in the base of the third stage separator and are removed via solids outlet 350. Cleaned gas passes through the cyclone outlet tubes 314 into a plurality of openings 414 into outlet tube 380.

Figure 4:
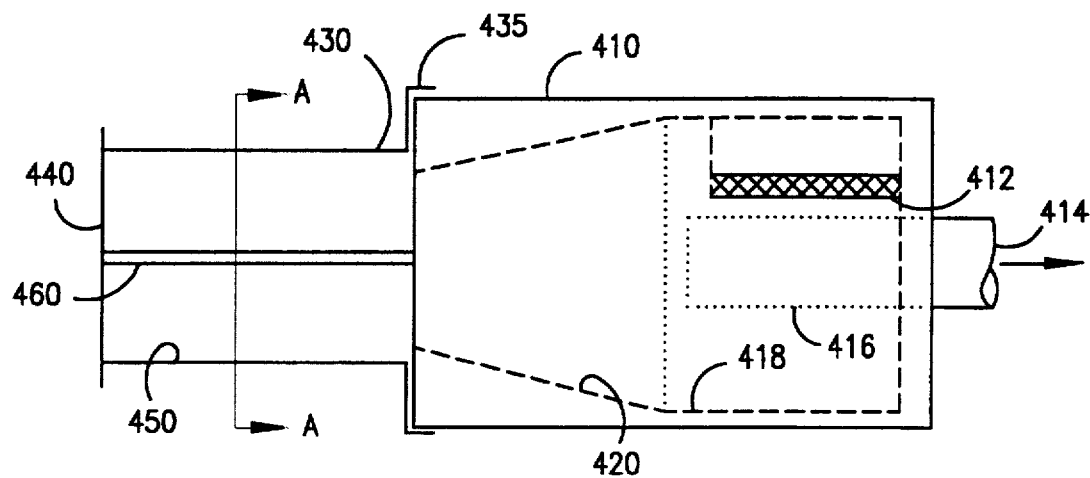
FIG. 4 (Invention) is a cross sectional view of a cyclone with a "scroll" solids outlet.
Figure 5:
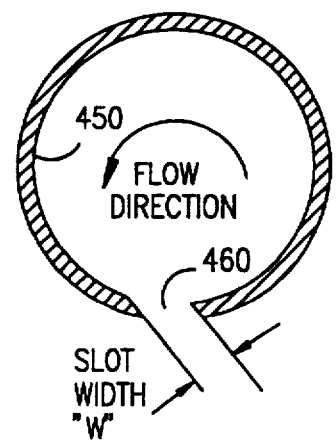
FIGS. 5 and 6 (Invention) are sectional views of the FIG. 4 cyclone taken along line AA.

FIGS. 4 and 5 show a cyclone of the invention with a "Scroll" type solids outlet.

Hot vapor and entrained catalyst enter cyclone 410, which corresponds to the horizontal, scroll outlet cyclone 335 shown in FIG. 3, via gas inlet 412. The incoming gas stream enters the cyclone tangentially, and swirls around outlet tube 416. The catalyst is thrown to the wall 418 while the gas passes through tube 416 and up through gas outlet 414. The wall of the outlet tube and wall 432 of the cyclone are typically lined with a refractory coating to reduce erosion. Catalyst thrown to the cylindrical sidewalls 418 passes through tapering section 420, which also may be lined with refractory, to the scroll outlet section 430. The scroll outlet section has an open end 435 slipped over the conventional portion of the horizontal cyclone 410. The scroll outlet may also be welded, bolted, or cast as an integral part of horizontal cyclone 410. Scroll outlet 430 has a closed end 440, which may be a simple plate or sheet, or weld cap, conical section, hemisphere or the like.

The strong vortex formed by the incoming gas in portion 410 of the horizontal cyclone extends into horizontal extension section 430. Solids flow from the tapering walls or truncated cone section 420 into the generally cylindrical section to circulate against interior cylindrical wall 450. Although a tapering wall 420 is shown it should be noted that the cyclone need not be tapered.

FIG. 5 shows a cross section of FIG. 4 taken along lines AA, looking toward the solids outlet end rather than the vapor outlet end. Solids are withdrawn via slot 460 which preferably extends along the length of section 430, from the open inlet end 435 to the closed end 440. Preferably the slot is cut with the bevel of the slot in the direction of the flow rotation. The slot is the outlet for the underflow/solids and should be sized so that the width w provides sufficient cross sectional area in the slot for withdrawal of the desired amount of underflow/solids, while still being narrow enough to effectively contain the vortex.

Figure 6:
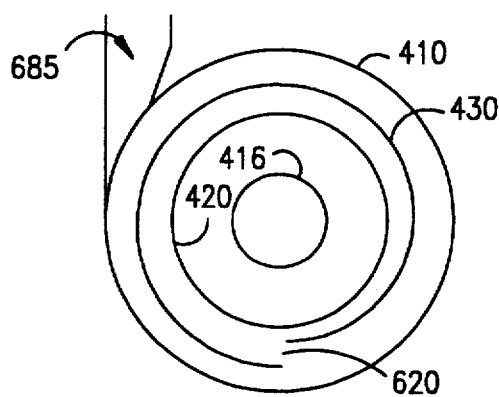

FIG. 6 shows a cross section of FIG. 4 taken along lines AA, looking toward the vapor outlet end rather than the solids outlet end, and with a different scroll configuration than the FIG. 5 cross section.

Entering gas and entrained solids are charged via tangential inlet 685 into the outer cylindrical wall 410 of the cyclone. Vapor with a reduced solids content is withdrawn via vapor outlet tube 416. Solids are discharged via slot 620, which preferably has a tapered edge.

Figure 7:
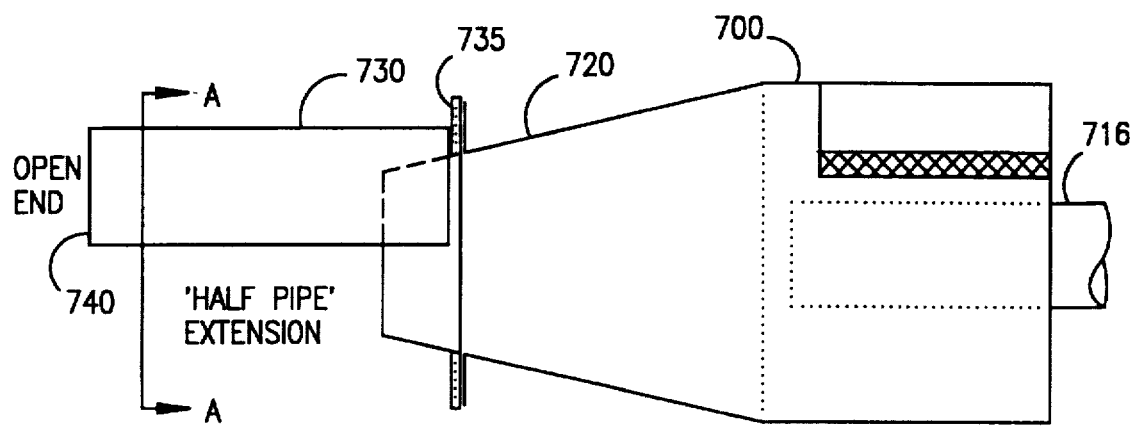
FIG. 7 (Invention) is a cross sectional view of a cyclone with a "halfpipe" solids outlet.

FIG. 7 (Invention) shows a cyclone with a modified solids outlet, a "half pipe" extension. The extension is so designated as it may literally be made from a piece of 8" schedule 40 pipe cut in half along its longitudinal axis. All other parts of the cyclone may be the same, so a detailed discussion is provided only for the halfpipe solids outlet.

A length of pipe 730, which has been split or cut in half along its length, is fitted via flange 735 as an extension onto conical portion 720 of cyclone 700. Vapor and solids are tangentially added via opening 785, with vapor removed via outlet tube 716. The solids outlet is a little hard to define, as solids are free to leave from open end 740 of extension halfpipe 730, or may simply fall down beneath halfpipe 730.

Figure 8:
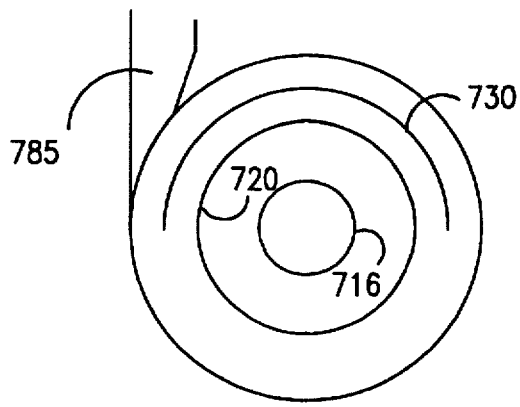
FIG. 8 (Invention) is a sectional view of the FIG. 7 cyclone taken along line AA.

FIG. 8 (Invention) shows a cross section of FIG. 7 taken along lines AA, looking toward the vapor outlet end rather than the solids outlet end. Entering gas and entrained solids are charged via tangential inlet 785 into cyclone 700 containing conical section 720. Vapor with a reduced solids content is withdrawn via vapor outlet tube 716. Solids are discharged as a vortex beneath halfpipe 720.

Figure 9:
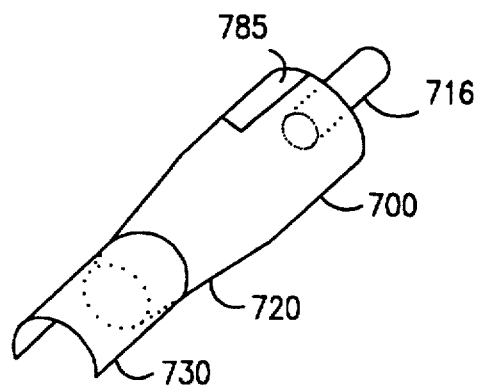
FIG. 9 (Invention) is a three dimensional sketch of the FIG. 7 cyclone.
Figure 11:
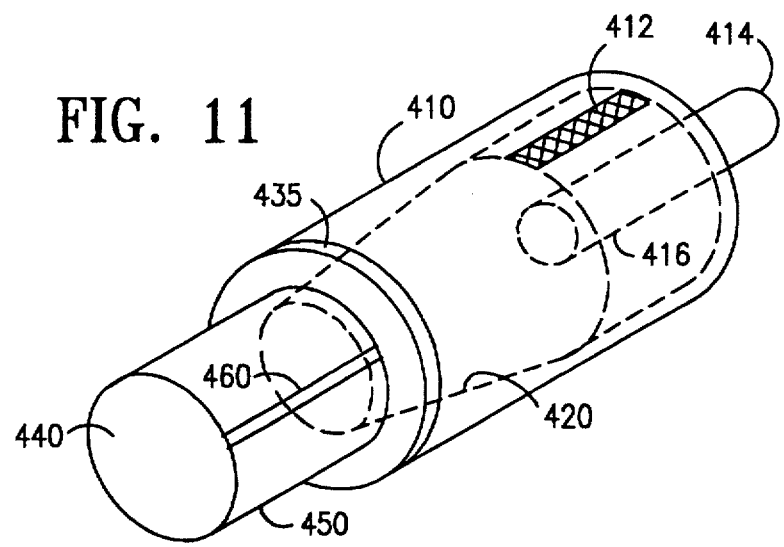
FIG. 11 (Invention) is an isometric view of the cyclone shown in FIGS. 4–6.

FIG. 9 (Invention) is a three dimensional sketch of the horizontal third stage cyclone with a halfpipe extension shown in FIGS. 7 and 8.

Having provided an overview of the FCC process and the new cyclone design, a more detailed review of the FCC process and of preferred cyclone separators follows.

FCC Feed

Any conventional FCC feed can be used. The feeds may range from typical petroleum distillates or residual stocks, either virgin or partially refined, to coal oils and shale oils. The feed frequently will contain recycled hydrocarbons, such as light and heavy cycle oils which have already been cracked. Preferred feeds are gas oils, vacuum gas oils, atmospheric resids, and vacuum resids. Most feeds will have an initial boiling point above about 650° F.

FCC Catalyst

Any commercially available FCC catalyst may be used. The catalyst can be 100% amorphous, but preferably includes some zeolite in a porous refractory matrix such as silica-alumina, clay, or the like. The zeolite is usually 5–40 wt % of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 wt % RE.

The catalyst inventory may contain one or more additives, either as separate additive particles, or mixed in with each particle of the cracking catalyst. Additives can enhance octane (shape selective zeolites, typified by ZSM-5, and other materials having a similar crystal structure), absorb SOX (alumina), or remove Ni and V (Mg and Ca oxides). The FCC catalyst composition, per se, forms no part of the present invention.

FCC Reactor Conditions

Conventional cracking conditions may be used. Typical riser cracking reaction conditions include catalyst/oil ratios of 0.5:1 to 15:1 and preferably 3:1 to 8:1, and a catalyst contact time of 0.1–50 seconds, and preferably 0.5 to 5 seconds, and most preferably about 0.75 to 4 seconds, and riser top temperatures of 900° to about 1050° F.

It is preferred, but not essential, to use an atomizing feed mixing nozzle in the base of the riser reactor. More details of use of such a nozzle in FCC processing is disclosed in U.S. Pat. No. 5,289,976, which is incorporated by reference.

It is preferred, but not essential, to have a riser catalyst acceleration zone in the base of the riser.

It is preferred, but not essential, to have the riser reactor discharge into a closed cyclone system for rapid and efficient separation of cracked products from spent catalyst. A closed cyclone system is disclosed in U.S. Pat. No. 5,055,177 to Haddad et al, which is incorporated by reference.

It is preferred, but not essential, to use a hot catalyst stripper, which heat spent catalyst by adding hot, regenerated catalyst to spent catalyst. Hot strippers are shown in U.S. Pat. Nos. 3,821,103 and 4,820,404, incorporated by reference.

The FCC reactor and stripper conditions, per se, can be conventional.

Catalyst Regeneration

The process and apparatus of the present invention can use conventional FCC regenerators. Most regenerators are either bubbling dense bed or high efficiency. The regenerator, per se, forms no part of the present invention.

Third Stage Separator

The cyclones of the invention are preferably used as a third stage separator removing catalyst and fines from regenerator flue gas. The conventional parts of the device are available from several vendors, such as Polutrol, Shell and Emtrol. We prefer the Polutrol TSS and Emtrols' Cytrol TSS.

Much of the cyclone design is conventional, such as sizing of the inlet, setting ratios of ID of the outlet tube to other dimensions, etc. Further details, and naming conventions, may be found in Perry's Chemical Engineers' Handbook, 6th Edition, Robert H. Perry and Don Green, which is incorporated by reference. The nomenclature discussion in Gas-Solids Separations, from 20–75 to 20–77, FIG. 20-106, 20-107 and 20-108 is referred to and incorporated by reference.

The slot area (460 in FIG. 5) should be sized large enough to handle anticipated solids flow, and will typically be from 10 to 200% or more of the cross sectional area of the outlet tube 414. The slot is preferably beveled so that fluid flow from the interior of the device through the slot is tangential, as shown in FIG. 5.

The slot may also be simply punched or drilled, or have a slightly raised lip to divert circulating solids from the interior of the solids outlet through the slot.

While the slot outlet is preferably the sole solids outlet the device will work with two outlets, the conventional underflow outlet, which can be a hole or holes in cap 440, and the slot 460. Preferably the size and role of any hole in cap 440 is reduced relative to its role in the prior art device, and relative to the cross sectional area of slot 460.

Cyclone Dimensions

The diameter of the cyclones in a third stage separator will always be much smaller than the diameter of cyclones used in the FCC regenerator or the reactor.

Typically, the third stage, horizontally mounted cyclones will have a diameter of 6 to 24 inches, preferably 8 to 18 inches, and most preferably 10 to 12 inches.

Preferred dimensions of various parts of the device are summarized below, with a naming convention referenced to numerals used in FIG. 4.

tube 418 diameter=Db tube 418 length=Lc (includes conical portion 220)

slot 412 length=Lw slot 460 width=W outlet 414 diameter=Do cone 420 diameter=Dc cylinder 450 length=Ls cylinder 450 diam.=Ds The preferred ratios may be stated as follows:

$$\frac{Ds}{Dc} \geq 1$$

$$\frac{\text{Outlet Area } (1/4\, Do^2)}{\text{Inlet Area } (Lw * lw)} \geq 0.4$$

$$\frac{Ls}{Lc} \leq 1$$

$$\frac{Lc}{Db} \geq 2.5$$

$$\frac{ll}{lw} \geq 2$$

$$\frac{Ls * w}{1/4\, Dc^2} \leq 1$$

Experiments

Several tests were conducted with small diameter cyclones of various sizes, using both 90 and 65 mm outlet tube diameters, with 2% underflow.

Three types of cyclone were tested:

1. Prior art cyclones (no extension on the solids outlet).

2. Scroll solids outlet (invention)—FIG. 6.

3. Halfpipe solids outlet (invention)—FIG. 9.

The cyclones were tested at various inlet velocities, generally ranging from 80 to 140 feet per second, fps, using used FCC catalyst. Cyclone efficiencies were determined at multiple inlet velocities to generate the data shown in FIG. 10, which shows cyclone efficiency as a function of inlet velocity for different types of cyclones.

The drawings are shown to scale. Both 65 and 90 mm outlet tube diameters were tested. The outlet extensions were 500 mm in length and were fabricated from 8" schedule 40 pipe for both the scroll and the halfpipe extensions.

For the scroll extension the slot width was 20 mm, and the slots were oriented with induced rotation. The width of the tangential inlet 685 was 85 mm, while the length of the tangential inlet was 130 mm, or just slightly less than the length of the outlet tube within the cyclone body.

Figure 10:
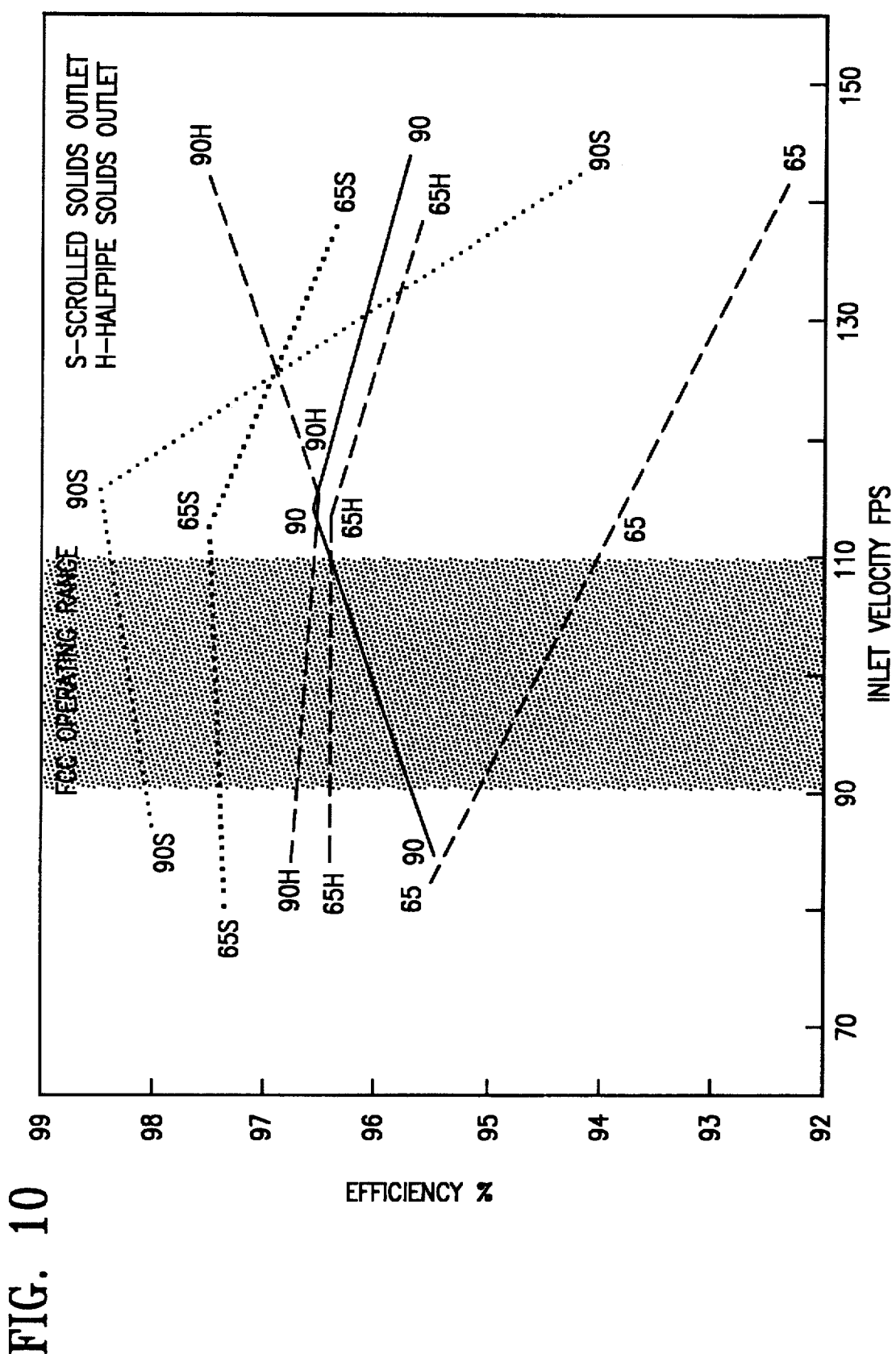
FIG. 10 shows is a graph of cyclone efficiency as a function of inlet velocity for different types of cyclones.

Experimental results plotted in FIG. 10 are also presented in the following tables. The results shown are the average of two runs at each condition.

TABLE 1

| 65 mm Gas Outlet Tube | | |
| --- | --- | --- |
| Inlet Velocity fps | Outlet Velocity fps | Efficiency % |
| 81.3 | 291.0 | 95.6 |
| 110.7 | 431.6 | 93.9 |
| 142.9 | 620.2 | 92.2 |

TABLE 2

90 mm Gas Outlet Tube

| Inlet Velocity fps | Outlet Velocity fps | Efficiency % |
|---|---|---|
| 84.1 | 151.9 | 95.5 |
| 112.4 | 212.1 | 96.6 |
| 144.3 | 292.4 | 95.7 |

TABLE 3

65 mm Gas Outlet Tube, Scrolled Solids Outlet

| Inlet Velocity fps | Outlet Velocity fps | Efficiency % |
|---|---|---|
| 78.8 | 283.0 | 97.4 |
| 112.4 | 446.9 | 97.5 |
| 138.4 | 617.4 | 96.4 |

TABLE 4

90 mm Gas Outlet Tube, Scrolled Solids Outlet

| Inlet Velocity fps | Outlet Velocity fps | Efficiency % |
|---|---|---|
| 85.5 | 155.9 | 98.0 |
| 114.9 | 222.1 | 98.5 |
| 142.2 | 293.6 | 94.1 |

TABLE 5

65 mm Gas Outlet Tube, Halfpipe Solids Outlet

| Inlet Velocity fps | Outlet Velocity fps | Efficiency % |
|---|---|---|
| 82.4 | 297.2 | 96.4 |
| 114.1 | 450.5 | 96.4 |
| 139.4 | 625.7 | 95.6 |

TABLE 6

90 mm Gas Outlet Tube, Halfpipe Solids outlet

| Inlet Velocity fps | Outlet Velocity fps | Efficiency % |
|---|---|---|
| 82.4 | 149.9 | 96.8 |
| 111.9 | 214.2 | 96.5 |
| 142.9 | 296.3 | 97.7 |

Discussion

The new cyclone design is easy to fabricate using conventional techniques. The device significantly improves removal of fine dust, that is, 0–5 micron particles. The new cyclone design will reduce erosion on power recovery turbine blades, and also reduce particulates emissions. Our device may be easily retrofit to commercial installations of small diameter, horizontally mounted multi-cyclone units to significantly enhance efficiency.

The capital expense involved is minimal, and there are almost no operating expenses associated with such a retrofit. There will be little increase in pressure drop getting through the cyclones, most of the energy consumed in such cyclones is used in accelerating the gas to form a high energy vortex.

The scroll solids outlet of the invention may even permit a significant reduction in pressure drop, because the improved efficiency of cyclone separation should permit use of less vigorous vortex formation and consequently, require less pressure drop to get through the cyclones.

We claim:

1. A horizontal cyclone separator comprising:
   a primary cylindrical cyclone body having a diameter and a longitudinal axis disposed horizontally or within 30° of horizontal, said primary cyclone body having:
   an open end portion having a tangential vapor inlet for a vapor stream and entrained solids for formation of a vortex of vapor and entrained solids;
   a cylindrical vapor outlet tube in said open end portion having an inlet extending into said primary cylindrical cyclone body and a vapor outlet tube longitudinal axis aligned with said longitudinal axis of said primary cylindrical cyclone body;
   a vortex outlet at an opposite end of said primary cylindrical cyclone body for vapor and entrained solids, said vortex outlet comprising a circular opening having a center in axial alignment with said vapor outlet tube, and wherein said vortex outlet has a diameter no greater than the diameter of said primary cylindrical cyclone body;
   a vortex-containment cylindrical body having cylindrical sidewalls, a length and having a diameter smaller than the diameter of said primary cyclone body at the tangential inlet, said vortex-containment cylindrical body having a longitudinal axis axially aligned with said primary cyclone body longitudinal axis and comprising:
   an open end connective with said vortex outlet of said primary cyclone body for admission of a vortex of gas and entrained solids;
   a sealed end portion located at an opposing end of said vortex-containment cylindrical body from said open end; and
   a solids and gas outlet slot in said sidewalls of said vortex-containment cylindrical body, said slot is in a lower portion of said vortex-containment cylindrical body, is parallel to the axis of said vortex-containment cylindrical body, and has a length at least 50% of the length of said vortex-containment cylindrical body.

2. The cyclone of claim 1 said slot has a length equal to the length of said vortex containment cylinder.

3. The cyclone of claim 2 wherein said slot has beveled edges for tangential removal of solids and gas from said vortex containment cylinder.

4. The cyclone of claim 1 wherein said primary cylindrical body and said vortex containment body are mounted horizontally.

5. The cyclone of claim 4 wherein said slot is under said axis of said vortex containment body.

6. The cyclone of claim 1 wherein the open area of the slot outlet on the sidewall is from 10% to 100% of the open area of the solids outlet.

7. The cyclone of claim 1 wherein the diameter of said vortex containment body is 100 to 150% of the diameter of said primary cyclone body at the tangential inlet.

8. The cyclone of claim 1 wherein the vortex containment body has a length at least equal to the length of the vapor outlet within the primary cyclone body.

9. A horizontal cyclone separator comprising:

a primary cylindrical cyclone body having a diameter and a longitudinal axis disposed horizontally or within 30° of horizontal, said primary cyclone body having:

an open end portion having a tangential vapor inlet for a vapor stream and entrained solids for formation of a vortex of vapor and entrained solids;

a cylindrical vapor outlet tube in said open end portion having an inlet extending into said primary cylindrical cyclone body and a vapor outlet tube longitudinal axis aligned with said longitudinal axis of said primary cylindrical cyclone body;

a vortex outlet at an opposite end of said primary cylindrical cyclone body for vapor and entrained solids, said vortex outlet comprising a circular opening having a center in axial alignment with said vapor outlet tube, and wherein said vortex outlet has a diameter no greater than the diameter of said primary cylindrical cyclone body;

a halfpipe extension, fluidly connected with said vortex outlet, comprising the upper one half of the surface of a right cylinder having a radius, an altitude and a longitudinal axis, and wherein said radius of said extension is less than a radius of said primary cyclone body;

said altitude of said extension is equal to or greater than said inlet of said vapor outlet tube extending into said cyclone body; and said longitudinal axis of said extension is axially aligned with said vapor outlet tube.

10. The cyclone of claim 9 wherein the cyclone is horizontal, the outlet tube has a diameter of 65 to 90 mm and a length inside said cyclone body of 125 to 150 mm, and said halfpipe extension is a 500 mm length of 8" schedule 40 pipe cut or split in half along the length of said pipe.

11. A horizontal cyclone separator comprising:

a primary cylindrical cyclone body having a diameter and a longitudinal axis disposed horizontally or within 30° of horizontal, said primary cyclone body having:

an open end portion having a tangential vapor inlet for a vapor stream and entrained solids for formation of a vortex of vapor and entrained solids;

a cylindrical vapor outlet tube in said open end portion having an inlet extending into said primary cylindrical cyclone body and a vapor outlet tube longitudinal axis aligned with said longitudinal axis of said primary cylindrical cyclone body;

a vortex outlet at an opposite end of said primary cylindrical cyclone body for vapor and entrained solids, said vortex outlet comprising a truncated conical section having a wide opening or base near said open end and an apex outlet at said opposite end, said truncated conical section having a longitudinal axis in axial alignment with said vapor outlet tube, and wherein said apex outlet has a diameter no greater than the diameter of said primary cylindrical cyclone body;

a vortex-containment cylindrical body having cylindrical sidewalls, a length and having a diameter smaller than the diameter of said primary cyclone body at the tangential inlet, said vortex containment cylindrical body having a longitudinal axis axially aligned with said primary cyclone body longitudinal axis and comprising:

an open end connective with said vortex outlet of said primary cyclone body for admission of a vortex of gas and entrained solids;

a sealed end portion located at an opposing end of said vortex-containment cylindrical body from said open end; and a solids and gas outlet slot in said sidewalls of said vortex-containment cylindrical body, said slot is in a lower portion of said vortex-containment cylindrical body, is parallel to the axis of said vortex-containment cylindrical body, and has a length at least 50% of the length of said vortex-containment cylindrical body.

\* \* \* \* \*